US010465035B2

(12) United States Patent
Clauwaert

(10) Patent No.: US 10,465,035 B2
(45) Date of Patent: Nov. 5, 2019

(54) COBALT AND MANGANESE BASED URETHANIZED POLYMERS FOR AIR DRYING POLYMER-BASED COATINGS, PAINTS AND INKS

(71) Applicant: EGE KIMYA SANAYI VE TICARET A.Ş., Istanbul (TR)

(72) Inventor: Eddy Clauwaert, Bruges (BE)

(73) Assignee: EGE KIMYA SANAYI VE TICARET A.S., Istanbula (TK)

( * ) Notice: Subject to any disclaimer, the term of this patent is extended or adjusted under 35 U.S.C. 154(b) by 0 days.

(21) Appl. No.: 14/773,110

(22) PCT Filed: Mar. 6, 2014

(86) PCT No.: PCT/TR2014/000058
§ 371 (c)(1),
(2) Date: Sep. 4, 2015

(87) PCT Pub. No.: WO2014/137307
PCT Pub. Date: Sep. 12, 2014

(65) Prior Publication Data
US 2016/0009849 A1  Jan. 14, 2016

(30) Foreign Application Priority Data

Mar. 6, 2013 (TR) ............... a 2013 02698
Feb. 5, 2014 (TR) ............... a 2014 01323

(51) Int. Cl.
| C08G 18/36 | (2006.01) |
| C09D 175/14 | (2006.01) |
| C08G 18/75 | (2006.01) |
| C08G 18/76 | (2006.01) |
| C08G 18/22 | (2006.01) |
| C09D 167/08 | (2006.01) |
| C08G 18/42 | (2006.01) |
| C08L 75/06 | (2006.01) |

(52) U.S. Cl.
CPC .......... *C08G 18/36* (2013.01); *C08G 18/222* (2013.01); *C08G 18/4288* (2013.01); *C08G 18/755* (2013.01); *C08G 18/7621* (2013.01); *C08L 75/06* (2013.01); *C09D 167/08* (2013.01); *C09D 175/14* (2013.01)

(58) Field of Classification Search
CPC .. C08G 18/222; C08G 18/36; C08G 18/4288; C08G 18/755; C08G 18/7621; C09D 175/14; C09D 167/08; C08L 75/06
See application file for complete search history.

(56) References Cited

U.S. PATENT DOCUMENTS

| 3,410,815 A | 11/1968 | Phillips et al. |
| 5,053,464 A * | 10/1991 | Shirai ............ D01F 6/70 502/159 |
| 5,681,915 A | 10/1997 | Lechner et al. |
| 2006/0014865 A1 | 1/2006 | Allard et al. |
| 2006/0167124 A1 | 7/2006 | Bernard et al. |
| 2007/0167603 A1 | 7/2007 | Urbano et al. |
| 2008/0146748 A1 | 6/2008 | Blum et al. |
| 2009/0233103 A1 * | 9/2009 | Chung ............ C08G 18/4879 428/424.8 |
| 2012/0041133 A1 | 2/2012 | Clauwaert |
| 2014/0316073 A1 * | 10/2014 | Locke ............ H01F 1/0063 525/418 |

FOREIGN PATENT DOCUMENTS

| DE | 44 34 694 C1 | 3/1996 |
| EP | 1 057 857 A2 | 12/2000 |
| EP | 1 471 123 A1 | 10/2004 |
| EP | 1 923 411 A2 | 5/2008 |
| EP | 2 370 534 | 10/2011 |
| GB | 550441 A | 1/1943 |
| GB | 1 232 194 A | 5/1971 |
| JP | 2005-002292 A | 1/2005 |
| JP | 2008-194839 A | 8/2008 |
| TW | 200906878 | 2/2009 |
| WO | 2004/050776 A1 | 6/2004 |
| WO | 2010/076031 A1 | 7/2010 |
| WO | 2011/098583 A1 | 8/2011 |
| WO | 2012/000934 A1 | 1/2012 |

OTHER PUBLICATIONS

Bieleman, Johan, "Additives for Coatings", Wiley-VCH, Weinheim, 2000, pp. 202-211
Internet Publication, "Isocyanates" retrieved from web Sep. 3, 2015, 5 pages, URL:www.poliuretanos.com.br/Ingles/Chapter1/131Isocyanates.htm.

* cited by examiner

*Primary Examiner* — Michael L Leonard
(74) *Attorney, Agent, or Firm* — Birch, Stewart, Kolasch & Birch, LLP

(57) ABSTRACT

The present disclosure relates to polymer compounds for use as polymerization agents in coatings, paints or inks. In one embodiment, a polymer compound comprises at least one of a cobalt-bearing urethanized polymer having a cobalt content of no more than 6% by weight and a mean molecular weight of no more than 2500 Da, or a manganese-bearing urethanized polymer having a manganese content of 1% to 6% by weight and a mean molecular weight of no more than 2000 Da.

18 Claims, No Drawings

COBALT AND MANGANESE BASED URETHANIZED POLYMERS FOR AIR DRYING POLYMER-BASED COATINGS, PAINTS AND INKS

This application is the National Stage of International Application No. PCT/TR2014/000058, filed on 6 Mar. 2014, which claims the benefit of the Turkish Patent Application No. 2013/02698, filed on 6 Mar. 2013 and the Turkish Patent Application No. 2014/01323, filed on 5 Feb. 2014, the disclosures of which are herein incorporated by reference for all purposes.

FIELD OF THE INVENTION

The present disclosure relates to drier compounds for oxidative drying of polymers, in particular for polymers used in coatings, paints and inks, based on unsaturated fatty acids, mostly from vegetal origin.

BACKGROUND ART

As the drying rate of air-drying systems such as alkyd paints is too slow for commercial applications, it is common practice to accelerate the drying process by adding metal driers to the system. Without driers, a typical alkyd paint would take as long as days, if not weeks to dry, which is clearly undesirable for most applications.

Primary driers catalyze the formation and/or decomposition of peroxides, which are formed by the reaction of oxygen with the air-drying binder or drying oil. Cobalt carboxylates are hitherto the principal constituents, at least if drying has to take place at room temperature and within a reasonable time. The use of cobalt carboxylates, and in particular of cobalt octoates have indeed been widely described, and is common practice throughout the paint industry (e.g. J. H. Bieleman, in Additives for Coatings, ED. J. H. Bieleman, Wiley VCH, Weinheim, 2000, p. 202).

Nevertheless cobalt has shown carcinogenic effects on in vivo inhalation tests. It is generally assumed that this toxicity is related to the cobalt ion, as the tested compounds had relatively high water solubility and generated appreciable cobalt ion concentrations. The available data for most of the standard cobalt carboxylates is such that serious concern about their carcinogenicity is justified, which makes their future use as driers in auto-oxidative paint and ink systems problematic.

Whereas the cobalt carboxylate is a primary drier, other transition metals such as manganese also fulfill a role in this process. The effect of manganese carboxylates is most noticeable at higher temperatures, or else at room temperature when used as an auxiliary drier with cobalt. The higher temperatures needed for the development of the catalytic activity of manganese as primary drier are around 80° C., conditions normally found on printing presses, and hence the use of manganese driers in these applications.

GB-A-1232194 teaches the preparation and use of acidic metal bearing polymers in anticorrosive paints. The envisaged products have free carboxyl groups terminating the structure, which are assumed to be a key in forming an adhering protective film on steel. A possible activity as drier is not mentioned, with classical driers such as cobalt naphthenate being indeed added to the paint.

GB-A-550441 describes water-insoluble metal salts of polymerized rosins. This document teaches polymer salts to counter the disadvantages of existing water-insoluble non-polymerized rosins, namely their pulverulence, tendency to coalesce, and their low melting point. The reduced aqueous solubility of polymerized rosins compared to non-polymerized rosins is not taught. Moreover, the described products are not particularly alkyd-compatible as they do not contain ester functions in their structure.

Although manganese is also an essential component of life, e.g. as the central atom in SOD's (Super Oxide Dismutase), there is a known toxicology on manganese compounds. Manganese carboxylates have not been classified as yet, but it has been demonstrated that manganese carboxylates release manganese ions in aqueous solutions. Concern about the future classification of manganese carboxylates is therefore justified.

It is known that the application of printing inks on fast running rotary printing presses causes the formation of an airborne aerosol of fine ink droplets around the printing press. As the primary risk to workers is therefore absorption through inhalation, it is important to lower the water solubility, and hence the release of manganese ions at the pH values typically found in lung fluids, which is around neutral.

The present disclosure provides a new class of cobalt-bearing and manganese-bearing compounds, which retain the catalytic effects of cobalt and manganese towards the oxidative drying of polymers, while greatly avoiding toxic effects by reducing the availability of the cobalt and manganese ions in aqueous systems.

It has been shown in previous patent publications no. US20120041133 A1 and EP2370534 A1 by the inventor of the present application that it was possible to reduce the water solubility, and additionally the resulting cobalt ion concentration by including the cobalt atom into a polymeric structure. The increased molecular weight with the more complex molecular structure reduced the hydrolysis of the compounds so that the threshold values for toxicity were not attained. It has been also disclosed that this was possible only with a claimed lowest molecular weight of 3000. Furthermore it was claimed that the compounds were preferably free of phosphorus, nitrogen or sulfur atoms.

The present disclosure provides for principal use of urethane structures, so that the desired properties can be obtained at a lower average molecular weight, resulting in a lower viscosity and better solubility.

SUMMARY

One embodiment in the present disclosure pertains to a series of cobalt-bearing compounds and/or manganese-bearing compounds for use as driers in coatings, paints and inks.

One embodiment of a polymer compound in the present disclosure comprises a cobalt-bearing urethanized polymer having a cobalt content of no more than 6% by weight and having a mean molecular weight of no more than 2500 Da.

Another embodiment of a polymer compound in the present disclosure comprises a manganese-bearing urethanized polymer having a manganese content of between 1% and 6% by weight and having a mean molecular weight of no more than 2000 Da.

Another embodiment in the present disclosure pertains to a series of coating, paint and ink compositions comprising the polymer compound as described herein as a curing catalyst.

Also described herein is the process for preparing the polymer compounds of the present disclosure.

Another embodiment in the present disclosure pertains to the use of the polymer compounds as described herein as a catalyst for drying of coatings, paints and inks based on unsaturated polymers and as a polymerization catalyst for hardening of unsaturated polyesters where the polymer compound is a cobalt-bearing urethanized polymer.

DETAILED DESCRIPTION

Compounds

One embodiment in the present disclosure pertains to a series of cobalt-bearing compounds and/or manganese-bearing compounds for use as driers in coatings, paints and inks.

In the present invention it has been demonstrated that it is possible to obtain a reduced toxicity risk by using a polyurethane structure—hence introducing nitrogen into the molecule—with a relatively lowered molecular weight. Furthermore, it has been found that reduced molecular weight results in a reduced viscosity, which is an additional advantage as substances with high viscosities are difficult to disperse in a coating, paint or ink system.

In one embodiment in the present disclosure, a polymer compound comprises a cobalt-bearing urethanized polymer having a cobalt content of preferably no more than 6% by weight and having a mean molecular weight of no more than 2500 Da. More preferably, the cobalt content of the compound is 4% to 6% by weight. They are preferably presented as solutions in an organic solvent such as hexylene glycol.

In another embodiment in the present disclosure, a polymer compound comprises a manganese-bearing urethanized polymer having a manganese content of preferably 1% to 6% by weight and having a mean molecular weight of no more than 2000 Da. Preferably, the polymer compound comprises manganese carboxylate sequences with an acid value of less than 40 mg KOH/g, and preferably of less than 20 mg KOH/g. They are also preferably presented as solutions in an organic solvent such as hexylene glycol.

It is noted that a polymer compound "for use as a polymerization agent" has to be at least partially soluble in the targeted coatings, paints and inks, which are typically based on organic compounds, in particular on oils such as vegetable oils. The mean molecular weight can be estimated from the remaining free functionalities of the polymer and or the polymer synthesis sequences, or by an appropriate analytical technique. Fatty acids are the preferred carboxylic acids, as such alkyd type polymers are more compatible with the alkyd binders used in paints and inks. The polymer compound of the present disclosure preferably has a manganese content of 1% to 6% by weight. The polymer compound may be unsaturated to increase its solubility in unsaturated binders for paints or inks, and to participate in the drying process not only as a catalyst. According to one embodiment, the polymer compound is completely soluble in printing ink media such as hydrocarbon or alkyd resins, or any mixture thereof.

The cobalt atoms or the manganese atoms are preferably an integral part of the backbone of the polymer. In other words, the cobalt atoms or manganese atoms form bonds in the backbone chain of polymers. Such bound cobalt or manganese imparts its full catalytic effect to the polymer, while its water solubility is greatly suppressed.

In a preferred embodiment, the urethanized backbone is aliphatic or aromatic.

Furthermore, the polymer compounds in the present disclosure are typically unsaturated, although saturated forms are also possible. The unsaturated forms have the advantage to copolymerize with the main binder in the system resulting in an even lower water solubility of the dried paint which is an advantage on the toxicological side. Accordingly, a compound in the present disclosure comprises manganese carboxylate sequences, resulting from reaction of a mix of mono and dicarboxylic unsaturated fatty acids.

On the other hand, as these compounds have a tendency to further polymerize during the synthesis, use of appropriate amounts of saturated carboxylic acids can be advantageous. Accordingly, in one preferred embodiment in the present disclosure, a compound further comprises saturated dicarboxylic acids and/or monocarboxylic acids.

In a preferred embodiment in the present disclosure, a compound has a viscosity no more than 5000 cP at 20° C. measured with Brookfield cone and plate viscometers spindle 2.

Compositions

Another embodiment in the present disclosure pertains to a series of coating, paint and ink compositions comprising a polymer compound as described above as a curing catalyst.

In a preferred embodiment, a coating composition is provided, comprising a binder and a polymer compound of the present disclosure.

In one embodiment, a binder polymer is selected from the group consisting of alkyd polymers and oil-modified alkyd polymers.

A further embodiment concerns coating formulations where a cobalt-bearing urethanized polymer compound of the present disclosure is used as the sole drier in a paint or ink system. The resulting cobalt concentration in a ready-to-use paint or ink is typically in the range of 0.02% to 0.06% by weight, calculated on the weight of the auto-oxidative binder in the system.

In a further embodiment of compositions of manganese-bearing urethanized polymer compounds, optionally, a cobalt-bearing compound can be added to the composition, such as a cobalt carboxylate or a polymeric cobalt carboxylate. The binder preferably comprises an unsaturated fatty acid modified polymer. The polymer compound may be adapted so as to copolymerize with this binder.

In one example, the coating composition has a manganese content of 0.01% to 0.5% by weight on binder.

According to one embodiment, compositions are prepared as solutions in an organic solvent or a mix of various organic solvents. The solvent(s) for instance can be selected from xylene, toluene, white spirit, D40, D60 and fatty acid esters.

Cobalt-bearing urethanized polymer compounds in the present disclosure are also applicable to composites for use as curing agents in unsaturated polyesters. Advantageously, compounds as described herein provide efficient and homogenous dispersion in unsaturated polyester based matrices of composites and provide efficient curing thereof. Differently than in coating, paint and ink applications where the oxygen from the ambient serves as an initiator, a peroxide initiator is needed for composites applications to initiate the curing.

General Synthesis Process

One embodiment in the present disclosure pertains to processes for preparing the polymer compounds as described herein.

The processes are based on the reaction of a cobalt-bearing or manganese-bearing raw material with an acid functional polymer or a mixture of polybasic and monobasic carboxylic acids, thereby obtaining a first intermediate compound; and thereafter this intermediate compound is further reacted with a polyfunctional isocyanate. In one embodiment, a cobalt-bearing raw material is cobalt hydroxide and in another embodiment, a manganese-bearing raw material is a manganese salt or oxide, preferably manganese acetate.

Preferably, this process is started by reacting a sub-stoichiometric amount of cobalt hydroxide or manganese acetate tetrahydrate with a mix of poly and mono carboxylic acids, as a first step. This step is conducted in an appropriate solvent. Care is taken to remove reaction water and acetic acid as far as possible. The further polymerization is then carried out with the polyfunctional isocyanate, commonly a bi-functional isocyanate.

Suitable divalent carboxylic acids are dimeric fatty acids, orthophtalic acid, isophtalic acid, terephtalic acid, maleic acid, adipic acid, succinic acid, sebacic acid, dodecanoic acid, or any mixture thereof. Optionally, monobasic acids are added, such as saturated or unsaturated fatty acids after reaction with dienes, neodecanoic acid, naphthenic acid, isononanoic acid, stearic acid, or any mixture thereof.

Suitable isocyanates are preferable difunctional isocyanates like toluene di-isocyanate, isophorone di-isocyante, and the like. Mixtures of di and mono isocyanates can also be used to control the average molecular weight.

This reaction scheme is applicable to any multivalent metal that can be obtained in a reactive form. Metals such as Ce, Zr, V, Sr, and Pb can be used.

The composition can also be modified adding non-cobalt bearing polymers or non-manganese bearing polymers as diluents. Solvents can be left in, removed or changed over to adjust the final viscosity of the ready-to-use product.

To be usable for the purpose as described, the final product is soluble in the majority of the polymers that are used in the manufacture of coatings, paints and inks.

There are several methods known to determine molecular weight of this kind of compounds. A primary method used is the normal GPC (Gel Permeation Chromatography) method. Analyses were performed on a polystyrene column, with samples diluted in tetrahydrofurane. Polystyrene standards were used for calibration, and afterwards the method was checked on normal vegetable oils and bodied oils for verification. Prior to injection, samples were decomposed and molecular weights calculated back to the original substance.

Preparations normally resulted in final cobalt content between 4% and 6% at suitable viscosity. Mean molecular weights did not exceed 2000 Da.

Preparations normally resulted in final manganese content of 1% to 6% at suitable viscosity. Mean molecular weights did not exceed 2000 Da.

Use of Compounds

Further embodiments in the present disclosure pertain to the use of the polymer compounds as described herein as catalysts for drying of coatings, paints and inks based on unsaturated polymers.

Another embodiment pertains to use of the cobalt-bearing polymer compounds as described herein as polymerization catalysts for hardening of unsaturated polyesters.

EXAMPLES FOR COBALT-BEARING POLYMER COMPOUNDS

Example 1

In a glass reaction flask, and under nitrogen blanket, a mix was made of 100 parts of dimeric fatty acids, 150 parts of soybean oil fatty acids, 150 parts of linseed oil fatty acids and 200 parts of xylene.

This mix was warmed to 120° C. and then gradually 34 parts of cobalt hydroxide are added, allowing reaction water to distill over. The reaction was finished increasing the temperature to 140° C. Then a partial vacuum was gradually applied in such a way as to distill over half of the original amount of xylene, thus assuring a low enough water content for the next step. Temperature is then lowered to 115° C.

Then 21 parts of toluene di-isocyanate were added and the reaction mix was kept stirring for two hours, after which the temperature was raised again to 160° C. and maintained for 2 hours to allow further polymerization.

Xylene was then removed under an absolute pressure of 40 mm Hg, and the resulting reaction mix diluted to 4% cobalt with a mix of diacetone alcohol and hexylene glycol.

Example 2

In a glass reaction flask, and under nitrogen blanket, a mix was made of 100 parts of dimeric fatty acids, 150 parts of soybean fatty acids, 150 parts of linseed oil fatty acids and 200 parts of xylene.

This mix was warmed to 120° C. and then gradually 34 parts of cobalt hydroxide were added, allowing reaction water to distill over. The reaction was finished increasing the temperature to 140° C. Then a partial vacuum is gradually applied in such a way as to distill over half of the original amount of xylene, thus assuring a low enough water content for the next step.

Temperature was then lowered to 115° C.

Then 22 parts of isophorone di-isocyanate were added and the reaction mix was stirred for two hours to allow further polymerization.

Xylene was then removed under a vacuum of 40 mmHg, and the resulting reaction mix was diluted to 4% cobalt with a mix of diacetone alcohol and hexylene glycol.

Example 3

In a glass reaction flask, and under nitrogen blanket, a mix was made of 80 parts of dimeric fatty acids, 17 parts of dodecanedioic acids, 150 parts of soybean fatty acids, 150 parts of sunflower oil fatty acids and 200 parts of xylene.

The mix was warmed to 120° C. and then gradually 34 parts of cobalt hydroxide were added, allowing reaction water to distill over. The reaction was finished increasing the temperature to 140° C. Then a partial vacuum was applied in such a way as to distill over half of the original amount of xylene, thus assuring a low enough water content for the next step.

Temperature was then lowered to 115° C.

Then 22 parts of isophorone di-isocyanate were added and the reaction mix was stirred for two hours to allow further polymerization.

Xylene was then removed under an absolute pressure of 40 mmHg, and the resulting mix was diluted to 4% cobalt with a mix of diacetone alcohol and hexylene glycol.

Example 4

In a glass reaction flask, and under nitrogen blanket, a mix was made of 100 parts of dimeric fatty acids, 150 parts of soybean fatty acids, 100 parts of linseed oil fatty acids and 30 parts of neodecanoic acid (Versatic V 10) and 200 parts of xylene.

The mix was warmed to 120° C. and then gradually 34 parts of cobalt hydroxide were added, allowing reaction water to distill over. The reaction was finished increasing the temperature to 140° C. Then a partial vacuum was applied such a way as to distill over about half of the original amount of xylene, thus assuring a low enough water content for the next step of the reaction.

Temperature was then lowered to 115° C.

Then 21 parts of toluene di-isocyanate were added and the mixture was stirred for 2 hours to allow further polymerization.

Xylene was the removed under an absolute pressure of 40 mmHg, and the resulting product was diluted to 4% Co with a mix of diacetone alcohol and hexylene glycol.

Example 5

The performance of the substances of examples 1 to 4 was tested for capacity as a drier.

Therefore, a varnish was made using a commercially available long oil alkyd supplied as a 70% by weight solution in aliphatic solvent. The alkyd solution was diluted to 60% nonvolatile content for application viscosity and then four portions were separated and to each drier substance were added to obtain a cobalt content of 0.05% Co by weight on the alkyd resin. These preparations were tested for drying speed against a standard commercially available cobalt 2-ethylhexanoate solution (EGEDry 12161 6% Cobalt) added to the same 0.05% Cobalt by weight on the alkyd resin.

Films were applied on glass plates using a doctor blade type applicator, and drying times registered in standard conditions of 20° C. and 60% to 70% relative humidity. Dry film thickness was 80μ.

Results:

| Substance | Solvent evaporation | Touch dry | Through dry |
|---|---|---|---|
| Example 1 | 30 min | 1 h 22 min | 6 h 45 min |
| Example 2 | 34 min | 1 h 15 min | 6 h 10 min |
| Example 3 | 29 min | 1 h 29 min | 7 h 20 min |
| Example 4 | 33 min | 1 h 18 min | 6 h 30 min |
| Standard | 33 min | 1 h 14 min | 6 h 50 min |

Example 6

The performance of the substances of examples 1 to 4 was tested for capacity as polyester curing accelerator.

100 parts of unsaturated polyester resin was mixed with 0.2 phr (per hundred resin) cobalt 2-ethylhexanoate (4% cobalt) standard polyester curing accelerator (catalyst). After the sample was brought to 25° C. in a water bath, 2phr of Butanox M 60 polyester initiator from AkzoNobel was mixed in the preparation and the gel time, the peak time, the gel temperature, the final appearance were recorded. The same was repeated for substances of example 1 through 4 instead of cobalt 2-ethylhexanoate (4% cobalt) standard.

Results are summarized below:

| Polyester promoter | Gel time | Peak time | Peak temperature | Appearance |
|---|---|---|---|---|
| Example 1 | 15 min 20 sec | 28 min 15 sec | 147° C. | Clear light purple |
| Example 2 | 14 min 11 sec | 29 min 06 sec | 151° C. | Clear light purple |
| Example 3 | 13 min 55 sec | 27 min 18 sec | 144° C. | Clear light purple |
| Example 4 | 14 min 39 sec | 31 min 04 sec | 137° C. | Clear light purple |
| Standard | 13 min 33 sec | 26 min 30 sec | 154° C. | Clear light purple |

Example 7

The solubilities of the substances obtained under the examples 1 to 4 were further tested for their solubility in synthetic lung fluid according to the OECD 105 guideline for this type of test. The flask method was chosen.

Synthetic alveolar fluid was prepared dissolving 0.9 g sodium chloride in water.

To 100 ml portions of the synthetic alveolar fluid was added 1 g of the test substance in a closed flask and under inert atmosphere. The flask were shaken for 24 hours at 25° C. and then let to rest for 2 hours. A portion of the water layer was filtered of and analyzed for cobalt content with atomic absorption spectrometry.

Results are as follows:

| Substance | Cobalt concentration |
|---|---|
| Example 1 | 16 mg/l |
| Example 2 | 14 mg/l |
| Example 3 | 28 mg/l |
| Example 4 | 34 mg/l |
| Standard cobalt 2-ethylhexanoate | 960 mg/l |

EXAMPLES FOR MANGANESE-BEARING POLYMER COMPOUNDS

Example 1

This example illustrates the synthesis of the polymer compound, its composition, solubility, and activity as a drier.

Synthesis

In a round bottomed glass reaction vessel, equipped with a stirrer, inlets for liquid and solid reactants, an inlet for inert gas, temperature control, an outlet for gaseous reaction products, are introduced 100 g of dimeric fatty acids and 700 g of sunflower oil fatty acids. Thereafter, at a temperature of 100° C. and under nitrogen, 175 g of manganese acetate tetrahydrate are slowly added under vigorous stirring, allowing the reaction byproducts, water and acetic acid to escape. The reaction is assumed to be completed when no more water or acetic acid is evaporating from the reaction mix at a temperature of 110° C.

200 g of xylene are then added and the temperature is raised to 145° C. The reaction vessel is equipped with a water/xylene separator so as to return the boiled-off xylene to the reaction vessel. Further xylene is added so as to obtain a constant reflux stream of xylene at a temperature of 160° C.

The reaction mix is then cooled to 120° C. and 54 g of isophorone diisocyanate is then added slowly and allowed to react over a period of 4 hours.

A very viscous brown colored mass is obtained. This product is dissolved in 150 g of hexylene glycol, and allowed to cool to ambient temperature. Manganese content is determined and further adjusted to 4% on total weight with more hexylene glycol.

Composition and Molecular Weight

The final product is a brown clear liquid with the following basic properties:
manganese content: 4% w/w
non volatile content 83.2%
viscosity 1.3 Pa·s at 20° C.

The compound of the example is analyzed using an AAS (Atomic Absorption Spectroscopy). A sample of the obtained product is diluted in THF, a standard solvent for this kind of analysis, and a chromatogram is obtained using a polystyrene column and a refractive index type of detector.

The mean molecular weight of the synthesized polymer compound amounts to 1450 Dalton.

The performances of the obtained products, in terms of aqueous solubility, and as a drier, are illustrated below.

Aqueous Solubility

The water solubility of the compound from the example is determined by the standard test according to the procedure described in OECD 105. In this procedure a sample with an amount chosen so as to produce a saturated aqueous solution is ground to a fine powder and shaken with distilled water at a temperature of 20° C. After 24 hours this suspension is allowed to cool to 20° C. and kept at this temperature during 24 more hours. After filtration, the manganese concentration in the filtrate is determined by atomic absorption spectrometry. The solubility of the polymeric manganese compound is found to be less than 10 mg Mn/kg.

This test is also performed on manganese octoate, a reference drier in common use in the paint and printing ink industry. The solubility of the reference octoate amounts to 165 mg Mn/kg.

Drier Activity

Manganese is considered to be a primary drier at elevated temperatures only. It has however also shown useful at room temperature when combined with cobalt-based driers.

For the evaluation of the drying activity of the invented polymer compounds, a drying test with a standard alkyd resin was performed: a long soybean oil alkyd prepared at 70% non volatile content, a typical value for a standard solvent borne decorative paint was used for this purpose. The alkyd was first diluted to 60% non volatile content with an aromatic group free petroleum distillate (Exxsol D40), and then the driers were added.

For the driers, combinations with standard calcium and zirconium carboxylates as auxiliary driers were chosen. As an additional combination, a mixture of cobalt carboxylate with the polymer compound according to this example was prepared. The driers were mixed with the alkyd resin, resulting in the drier concentrations shown in Table 1.

TABLE 1

Drier concentrations

| Composition | Ca % | Zr % | Co % | Mn % | Mn compound |
|---|---|---|---|---|---|
| I | 0.2 | 0.1 | | 0.05 | example |
| II | 0.2 | 0.1 | | 0.05 | octoate |
| III | | | 0.025 | 0.025 | example |
| IV | | | 0.025 | 0.025 | octoate |

The different paints are applied with an applicator on a glass plate. The wet layer thickness is 75 μm. The drying temperature is 20° C. and the relative air humidity 60-70%. The drying process is monitored on a drying time recorder running at 2 cm/h, with needle tips of 1 mm. The different drying times were reported in Table 2.

TABLE 2

Drying times

| Composition | Dust free | Through dry |
|---|---|---|
| I | 5 h 20 min | 12 h |
| II | 6 h 35 min | 13 h 30 min |
| III | 3 h 20 min | 8 h 15 min |
| IV | 3 h 40 min | 10 h 20 min |

It appears that of 0.025% Mn on alkyd resin solids is a sufficient or even optimal amount. The results show a clear advantage of using the polymeric manganese compound, a result that is assumed to stem from the co-polymerization of the compounds with the alkyd resin.

Manganese octoate indeed remains as a foreign substance in the final composition. The result of the manganese-cobalt combination shows even faster drying times, in line with the requirements of the paint industry for air drying alkyd systems.

Example 2

This example illustrates the importance of the excess basic functionality of the polymers.

To demonstrate this effect, the synthesis on the example is repeated adding excess organic acid during synthesis. In this case, the chosen organic acid is 2-ethylhexanoic acid. The aqueous solubility tests are according to OECD 105.

It can be seen that the aqueous solubility increases with the acid value of the polymer. Although still acceptable, a solubility of less than 50 mg/l of Mn is recommended. Accordingly, an acid value of less than 40 mg KOH/g is preferred. This contrasts with prior art such as GB-A-1232194 describing metal-containing acidic polymers for use in rust-proofing applications.

The foregoing examples have been provided merely for the purpose of explanation and are in no way to be construed as limiting of the present invention. While the present invention has been disclosed with reference to exemplary embodiments, the words used herein are intended to be words of description and illustration, rather than words of limitation. While the present invention has been described with reference to particular materials and embodiments, the present invention is not intended to be limited to the particulars disclosed herein; rather, the present invention extends to all functionally equivalent structures and uses, such as are within the scope of the appended claims. Changes may be made, within the purview of the appended claims, as presently stated and as may be amended, without departing from the scope and spirit of the present invention. All terms used in this disclosure should be interpreted in the broadest possible manner consistent with the context.

The invention claimed is:

1. A polymer compound comprising at least one of:
   a cobalt-bearing urethanized polymer having a cobalt content of 4% to 6% by weight and a mean molecular weight of no more than 2500 Da, or
   a manganese-bearing urethanized polymer having a manganese content of 1% to 6% by weight and a mean molecular weight of no more than 2000 Da,
   wherein the cobalt or manganese is an integral part of a backbone of the polymer compound, wherein the polymer compound comprises cobalt carboxylate linkages or manganese carboxylate linkages and
   the polymer compound is suitable for use as a polymerization agent in coatings, paints, or inks.

2. The polymer compound according to claim 1, further comprising mono and dibasic carboxylic acids.

3. The polymer compound according to claim 2, wherein at least part of the dibasic carboxylic acids is unsaturated dimeric acids derived from natural fatty acids.

4. The polymer compound according to claim 1, wherein the urethanized polymer is soluble in printing inks including hydrocarbon resins, alkyd resins, or any mixture thereof.

5. The polymer compound according to claim 1, further comprising a viscosity no more than 5000 cP at 20° C.

6. A drier composition, comprising:
a polymer compound, including at least one of:
   a cobalt-bearing urethanized polymer having a cobalt content of 4 to 6% by weight and a mean molecular weight of no more than 2500 Da, or
   a manganese-bearing urethanized polymer having a manganese content of 1% to 6% by weight and a mean molecular weight of no more than 2000 Da,
   wherein the cobalt or manganese is an integral part of a backbone of the polymer compound; wherein the polymer compound comprises cobalt carboxylate linkages or manganese carboxylate linkages and
a solvent including hexylene glycol.

7. A coating composition, comprising:
a polymer compound, including at least one of:
   a cobalt-bearing urethanized polymer having a cobalt content of no more than 6% by weight and a mean molecular weight of no more than 2500 Da, or
   a manganese-bearing urethanized polymer having a manganese content of 1% to 6% by weight and a mean molecular weight of no more than 2000 Da;
   wherein the cobalt or manganese is an integral part of a backbone of the polymer compound; wherein the polymer compound comprises cobalt carboxylate linkages or manganese carboxylate linkages and
an unsaturated fatty acid modified polymer-based binder.

8. The coating composition according to claim 7, wherein the polymer compound is a manganese-bearing urethanized polymer, and wherein the coating composition further comprises a cobalt-bearing compound.

9. The coating composition according to claim 7, wherein the cobalt content is 0.02% to 0.06% by weight of the binder.

10. The coating composition according to claim 7, wherein the manganese content is 0.01% to 0.5% by weight of the binder.

11. A process for preparing a polymer compound comprising cobalt or manganese in the backbone, the process comprising:
   reacting sub-stoichiometric amount of cobalt hydroxide or manganese acetate with a mix of poly and mono carboxylic acids; and
   polymerizing the reaction product with a polyfunctional isocyanate.

12. A method of curing a polymer-based coating composition, the method comprising:
   providing a polymer compound, including at least one of:
      a cobalt-bearing urethanized polymer having a cobalt content of no more than 6% by weight and a mean molecular weight of no more than 2500 Da, or
      a manganese-bearing urethanized polymer having a manganese content of 1% to 6% by weight and a mean molecular weight of no more than 2000 Da;
      wherein the cobalt or manganese is an integral part of a backbone of the polymer compound wherein the polymer compound comprises cobalt carboxylate linkages or manganese carboxylate linkages
   mixing the polymer compound with an unsaturated fatty acid modified polymer-based binder; and
   drying the mixture of the polymer compound and the binder.

13. The polymer compound according to claim 1, further having an aqueous cobalt solubility of between 16 and 34 mg/l or an aqueous manganese solubility of between 10 and 50 mg/l, tested according to OECD 105.

14. The polymer compound of claim 1 which is a polymerization agent.

15. The drier composition of claim 6, wherein the polymer compound is a polymerization agent.

16. The coating composition of claim 7, wherein the polymer compound is a polymerization agent.

17. The process of claim 11, wherein the polymer compound is a polymerization agent.

18. The method of claim 12, wherein the polymer compound is a polymerization agent.

* * * * *